Figure 1:
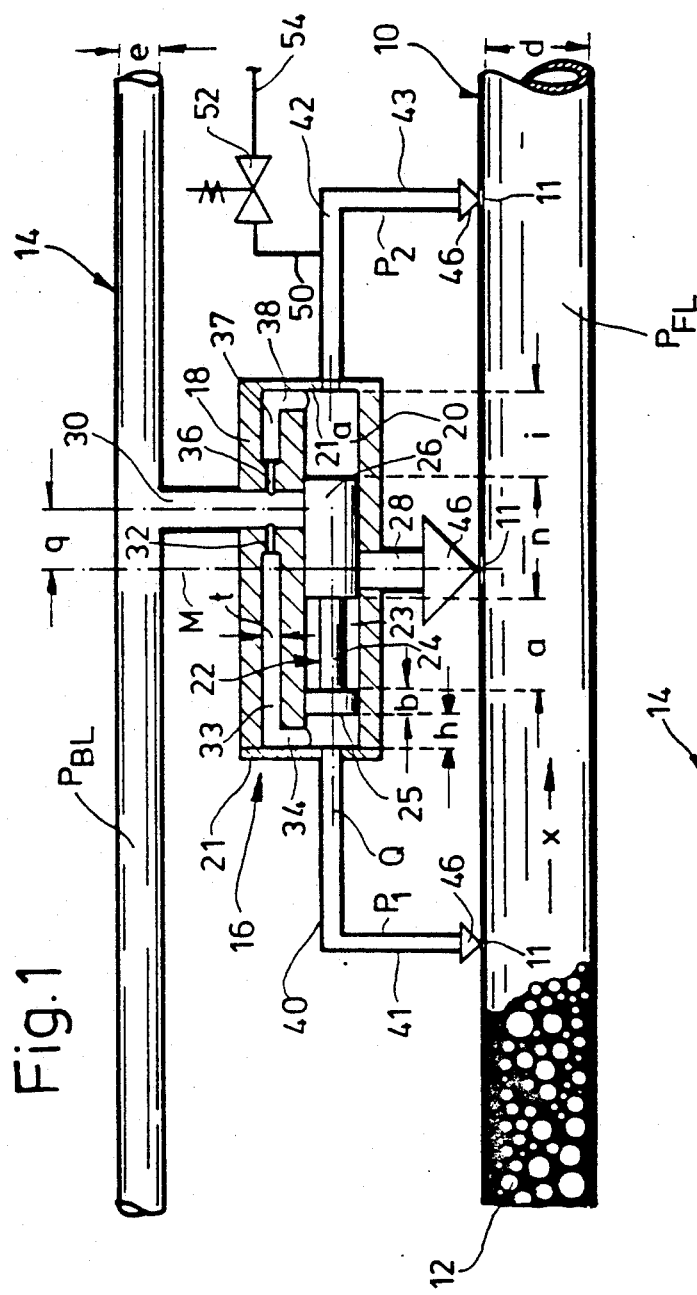

United States Patent [19]

Federhen et al.

[11] Patent Number: 5,224,802
[45] Date of Patent: Jul. 6, 1993

[54] METHOD AND APPARATUS FOR CONTROLLING THE INFEED OF AIR INTO THE CONVEYOR CONDUIT OF A PNEUMATIC CONVEYOR INSTALLATION

[75] Inventors: Bernd Federhen, Siegen; Manfred May, Niederfischbach, both of Fed. Rep. of Germany

[73] Assignee: Alb. Klein GmbH & Co. KG, Niederfischbach, Fed. Rep. of Germany

[21] Appl. No.: 893,372

[22] Filed: Jun. 4, 1992

[30] Foreign Application Priority Data

Jun. 6, 1991 [DE] Fed. Rep. of Germany ........ 4118560

[51] Int. Cl.⁵ .............................................. B65G 53/66
[52] U.S. Cl. ...................................... 406/95; 406/11; 406/14; 406/93; 406/94
[58] Field of Search ............ 406/93, 94, 95, 11, 406/14, 15, 19, 85, 192; 137/906

[56] References Cited

U.S. PATENT DOCUMENTS

| | | | |
|---|---|---|---|
| 4,715,748 | 12/1987 | Krambrock | 406/95 X |
| 4,861,200 | 8/1989 | Lübbehusen et al. | 406/95 X |
| 4,909,676 | 3/1990 | Heep et al. | 406/95 X |
| 4,955,761 | 9/1990 | Federhen et al. | 406/93 X |

FOREIGN PATENT DOCUMENTS

| | | | |
|---|---|---|---|
| 449393 | 9/1927 | Fed. Rep. of Germany | 406/95 |
| 255929 | 4/1988 | Fed. Rep. of Germany | 406/95 |
| 3644119 | 6/1988 | Fed. Rep. of Germany | 406/14 |
| 212526 | 12/1983 | Japan | 406/94 |
| 18635 | 1/1986 | Japan | 406/95 |
| 127523 | 5/1989 | Japan | 406/94 |

Primary Examiner—Margaret A. Focarino
Assistant Examiner—James M. Kannofsky
Attorney, Agent, or Firm—Bachman & LaPointe

[57] ABSTRACT

In a method of controlling the infeed of air from an auxiliary conduit of a pneumatic conveyor installation into a tubular conveyor conduit into which compressed gas is introduced from a connecting conduit and the latter, upon a rise in pressure occurring upstream of the mouth thereof in the conveyor direction, in the conveyor conduit, is opened with a supply of air from an auxiliary conduit at high pressure, said supply of air into the conveyor conduit is interrupted in the event of pressure equalisation building up therein, by a control member which opens and closes the connecting conduit and which is guided in a path of movement which can be acted upon by at least one secondary flow of the auxiliary conduit, and a closing force is applied in a pulse-wise fashion to the control member.

19 Claims, 2 Drawing Sheets

METHOD AND APPARATUS FOR CONTROLLING THE INFEED OF AIR INTO THE CONVEYOR CONDUIT OF A PNEUMATIC CONVEYOR INSTALLATION

The invention relates to a method of controlling the infeed of air from a secondary or auxiliary conduit of a pneumatic conveyor installation into a tubular conveyor conduit into which compressed gas is introduced from a connecting conduit and the latter, upon a rise in pressure occurring upstream of the mouth thereof in the conveying direction, in the conveyor conduit, is opened with a supply of air from the auxiliary conduit at high pressure, wherein said supply of air into the conveyor conduit is interrupted in the event of pressure equalisation building up therein—preferably in the region upstream of and downstream of the mouth of the connecting conduit—by means of a control member which opens and closes the connecting conduit and which is guided in a path of movement which can be acted upon by at least one secondary flow of the auxiliary conduit. In addition the invention concerns an apparatus which is particularly but not exclusively suited for this method, for controlling the infeed of air from an auxiliary conduit of a pneumatic conveyor installation into a tubular conveyor conduit through a connecting conduit which is closable by means of a control member; in particular by means of a piston-like slider which is movable in a flow chamber and which in a basic position closes off two portions of the connecting conduit relative to each other and which at least upstream is communicated with a sensor conduit which opens into the conveyor conduit and which-possibly by way of a throttle section—is connected to the portion of the connecting conduit, which leads to the auxiliary conduit.

A method of that kind and a corresponding apparatus are to be found in German patent specification No 3 644 119.

In that apparatus, the pressure in the tubular conveyor conduit acts on the slider which is constantly acted upon by a spring, in opposite relationship to the conveying direction. The force of the spring must be so selected that, with equal pressure at the ends, the slider is pushed into the closed position, in which respect it has to overcome the friction relative to the valve housing. So that the slider reaches the closed position even under disadvantageous operating conditions, in practice the spring force is selected to be greater than the frictional force; if the pressure in the conveyor conduit upstream of the slider—as viewed in the conveyor direction—rises to a greater value than downstream of the slider, then an opening force acts on the slider. The opening force must be so great that the spring force and the friction of the slider in the valve housing are overcome.

At a response pressure at which the apparatus opens, the frictional force between the slider and the housing appears twice in the force balance sheet while in addition the spring force required for securely closing the slider with equal pressure at both ends is also involved in the force balance sheet.

With knowledge of that state of the art, the inventor set himself the aim of providing an air infeed with slider, which has a lower response pressure and which also reliably closes with equal pressure at both end faces.

The teaching set forth in claim 1 provides for the attainment of that object; in principle a force closing the slider acts thereon in a pulse-wise manner. Such a force can be produced for example electromagnetically or—preferably—by air pulses which are applied to the end of the slider which is downstream in the conveyor direction. As those pulses last only a short time, their force or pressure can be selected to be so high that the slider reliably closes, without simultaneously increasing the response pressure for air infeed purposes.

An apparatus which is used according to the invention is distinguished in that the control member is acted upon by pneumatic pressure at its end which faces in the conveyor direction and the pneumatic pressure is taken in a pulse-controlled fashion from the auxiliary conduit and/or a separate pressure source.

In an embodiment the sensor conduit is connected to a portion, which faces in opposite relationship to the conveyor direction, of the longitudinal bore which accommodates the control member or the slider, and by way of said portion, a duct and a throttle section, to the connecting conduit portion which leads to the auxiliary conduit, wherein a portion of the longitudinal bore which is arranged downstream of the control member or slider in the conveyor direction is connected to a separate pressure source for a pressure cushion and is connected to a pulse conduit with pulse valve.

That becomes significant in particular if the response pressure is to be selected at a higher value than results from the frictional conditions in respect of the slider and the housing; a constant pressure cushion of adjustable pressure and/or a spring whose force however is not sufficient for moving the slider may be provided on the downstream end of the slider, and the spring force can also be adjustable but should not reach the value which would be required for closing the valve without the pulse force.

In accordance with the invention a further solution provides that disposed on both sides of the piston-like slider on the longitudinal bore of the housing as a flow chamber are sensor conduits which are each connected by way of a throttle section to the portion of the connecting conduit which leads to the auxiliary conduit, wherein extending from the throttle sections are ducts which open approximately at the ends into the longitudinal bore, and a portion of the longitudinal bore which faces in the conveyor direction is connected to a pulse conduit which contains a pulse valve.

The pressure force for the pulses can therefore be taken from the auxiliary conduit if the pressure thereof is sufficient for resetting of the slider or sliders or—if the pressure thereof is not sufficient—a separate auxiliary conduit which is fed with a higher pressure.

Instead of pulse generation by means of an electromagnetic valve and the electrical actuating system required for that purpose (clock production), pulse generation may also be effected by means of known, exclusively pneumatic circuits.

At any event the slider axis may also be vertically oriented so that the slider weight assists with the closing movement.

The frequency of the closing pulses is adapted to the installation and the properties of the material to be conveyed. Thus for example in the case of a slow plug conveying operation, a pulse control of about 1 Hz with a pulse length of 0.1 second has proven to be suitable.

In accordance with the invention the air pulses can be produced by electromagnetic values at each control member or a plurality of the control members are connected to a common pulse line and are switched from there.

In accordance with a further feature the valves on the conveyor conduit may jointly use the sensor locations which are disposed between them; the intermediate sensor location is used by the valve which lies first in the conveyor direction as the 'switch-off sensor' and by the second as the 'switch-on sensor'.

In accordance with a still further feature the slider is in the form of a magnet and is associated with a magnetic coil.

Figure 2:
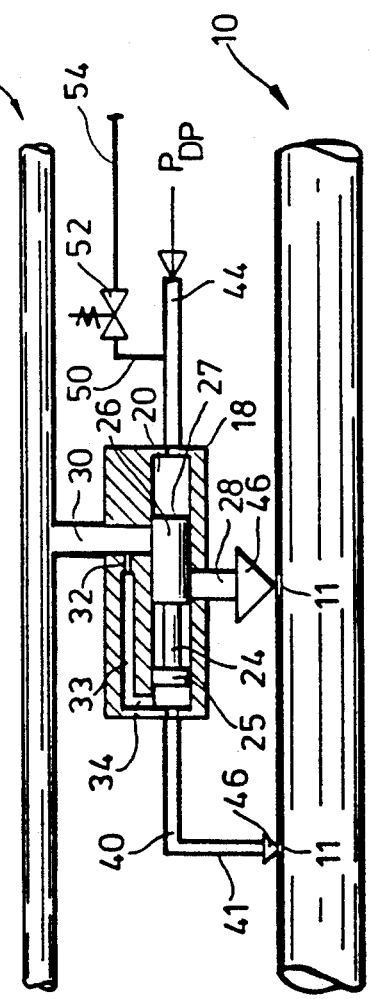
Figure 3:
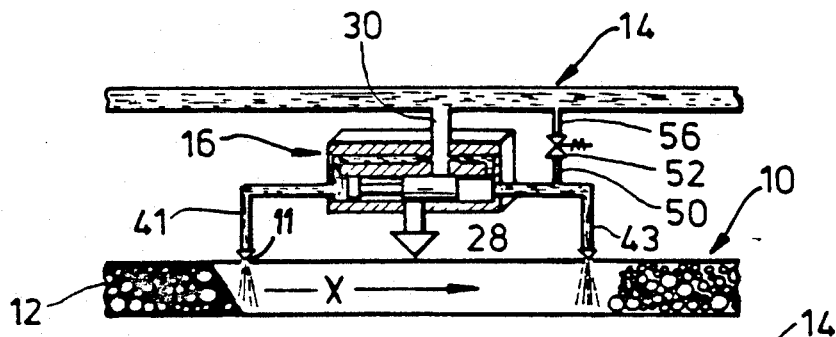

Further advantages, features and details of the invention are apparent from the following description of preferred embodiments and with reference to the drawings in which:

FIG. 1 is a diagrammatic view in longitudinal section through a control member between a conveyor conduit for loose material and an auxiliary conduit, FIG. 2 shows another embodiment of a control member between a conveyor and an auxiliary conduit, FIG. 3 is a partly axonometric longitudinal section through a part of a conveyor installation with control member, on a smaller scale than FIGS. 1 and 2, and FIGS. 4 through 7 show the conveyor installation of FIG. 3 in different operating positions relative to FIG. 3.

A control member 16 with a parallelepipedic housing block 18 is provided between a conveyor conduit 10 of an inside diameter d, for a plug of loose material 12 which is moved in the direction indicated by x, and a parallel secondary or auxiliary conduit 14 whose diameter e here approximately corresponds to a quarter of the diameter d of the conveyor conduit 10. The housing block 18 contains a longitudinal or cylinder bore 20 which is parallel to the conduits 10, 14, for a slider 22 comprising two plunger-like piston bodies 25, 26 of different lengths b, n, which are connected by an axial slider bar 24 of a length a. The slider bar 24, with the wall of the longitudinal or cylinder bore 20, defines an annular chamber 23.

A connecting conduit 28 which is directed transversely to the conveyor conduit 10 starts from the longitudinal bore 20 which is closed at both ends, for example by a removable end plate 21 or an end wall $21_a$ which define the ends of the bore 20 and are integral with the housing block 18, the connecting conduit 28 extending on the central axis M, which is radial relative to the longitudinal bore 20, of the housing block 18. Also extending from the longitudinal bore 20 and displaced by a distance q in the direction of the longitudinal axis Q of the longitudinal bore 20, relative to the connecting conduit 28, is an off-center connection conduit 30 which connects the longitudinal bore 20 to the auxiliary conduit 14.

Opening into the off-center connection conduit 30 on a common diameter in FIG. 1 are two throttle sections or locations 32, 36 which are thus disposed in mutually opposite relationship, being of a diameter of preferably up to 1 mm, which are both extended in the form of duct portions 33 and 37 respectively of larger diameter t parallel to the longitudinal bore 20. They are connected to the longitudinal bore by radial bores 34 and 38 respectively and reach the longitudinal bore 20 at the bore ends defined by plate 21 and wall $21_a$ respectively. Extending from the latter, in coaxial relationship with respect to the longitudinal bore 20, are sensor conduits 40, 42 which face with radial portions 41 and 43 respectively towards the conveyor conduit 10.

Arranged at the transition between the connecting or transverse conduit 28 and the radial portions 41, 43 of the sensor conduits 40, 42 on the one hand and lateral openings 11 in the conveyor conduit 10 on the other hand are non-return valves as switching sensors or filters 46. The non-return valves or filters 46 prevent the ingress of particles of dirt into the longitudinal bore 20.

A pulse conduit 50 ends in the sensor conduit 42 which is at the right in FIG. 1, with the pulse conduit 50 being connected to a secondary conduit 54 by means of a pulse valve 52.

In the embodiment shown in FIG. 2, a sensor conduit 40 with radial portion 41 is associated only with the short piston body 25 which lies to the right therein; the portion of the longitudinal bore 20 which extends from the end 27 of the longer piston body 26 here opens exclusively to a feed line 44 to which the pulse line 50 is connected.

In the basic position of the slider 22, which is shown in FIGS. 1 and 2, the shorter piston body 25 thereof is disposed at a spacing h relative to the inside of the end plate 21 and the longer piston body 26 is disposed at a spacing i relative to the most closely adjacent end wall $21_a$ of the bore and in that situation the slider 22—being between the radial portions 41, 43 of the sensor conduits 40, 42—closes both the downwardly directed transverse conduit 28 and also the off-center connection conduit 30 which is displaced parallel thereto. Accordingly in the basic position the transverse conduit 28 is separated from the connection conduit 30 and thus from the auxiliary conduit 14.

Figure 5:
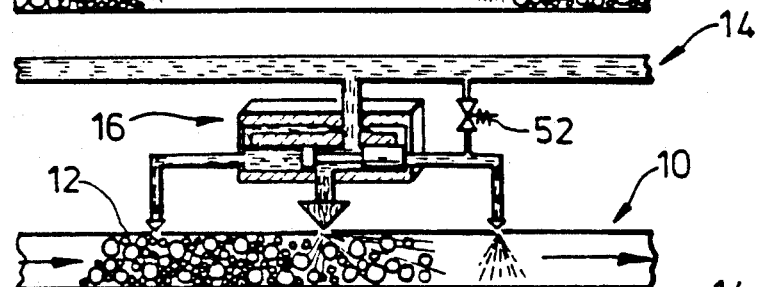
Figure 6:
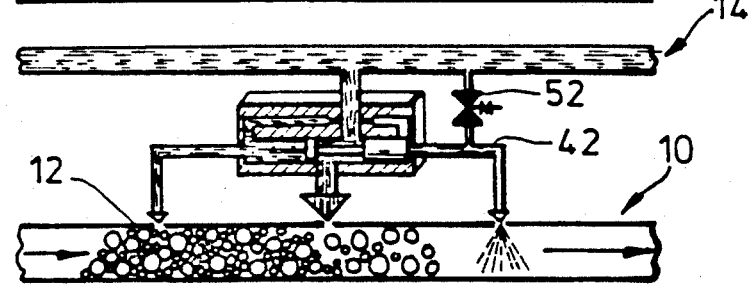

An air pressure $P_{BL}$ which is obtained in the auxiliary conduit 14 is usually higher than the pressure $P_{FL}$ in the conveyor conduit 10 which, as stated, is separated from the auxiliary conduit 14 in the basic position of the slider 22, by virtue of the piston body 26. If for example a plug 12 which is approaching in the conveyor conduit 10 causes a rise in the pressure $P_1$; in the first sensor conduit 40—which is connected on the one hand by way of its throttle section 32 to the connection conduit 30 and on the other hand through the other throttle section 36 to the longitudinal bore 20—, the slider 22 moves in the conveyor direction x until the annular chamber 23 embraces both transverse conduits 28, 30; compressed air $P_{BL}$ flows from the auxiliary conduit 14 into the conveyor conduit 10 (FIGS. 5 and 6).

When the plug 12 which is subjected to pressure has passed the mouth of the transverse conduit 28 and the mouth of the second sensor conduit 42, the pressure $P_1$ and $P_2$ in both sensor conduits 40 and 42, respectively, is equalised again and the slider 22 slides back into its basic position at the next closing pulse.

A very small amount of air flows through the sensor conduits 40, 42, being taken from the auxiliary conduit 14 and being determined in regard to its quantity by the throttle sections 32, 36.

The movement of the slider 22 in opposite relationship to the conveyor direction x is effected by its being acted upon by a pulse flow which is introduced through the pulse conduit 50, of for example 1 Hz, with a pulse length of 0.1 second, for slow plug conveying. The pulses can be produced for example by electromagnetic valves.

In the embodiment shown in FIG. 1, the pulse conduit 50 which opens into the sensor conduit 42, is fed from a compressed air network (not shown) through the auxiliary conduit 54. In the embodiment shown in FIG. 2, as already mentioned, the downstream-disposed sensor conduit 42 is omitted as here a constant pressure cushion with an adjustable pressure $P_{DP}$ which does not have to be sufficient for movement of the slider 22 is maintained at the end 27 of the piston body 26. The pressure $P_{DP}$ is set in accordance with the response pressure desired for the respective apparatus.

In FIGS. 3 through 7, instead of the above-described auxiliary conduit 54, there is a connection 56 to the auxiliary conduit 14, which is here aligned with the pulse conduit 50; the pulse air is taken exclusively from the auxiliary conduit 14.

In FIG. 3 the slider 22 is in the basic position, that is to say it is closed. The pulse valve 52 is not active, there is therefore no air infeed, only actuation with sensor air:

$$P_1 = P_2.$$

Figure 4:
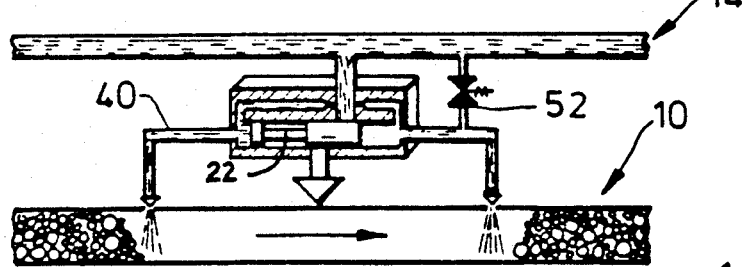

Even if no plug 12 is disposed at the sensor location 11/41, the pulses come at the selected frequency and duration in order to hold in the basic position the slider 22 which closes in the basic position (FIG. 4). In FIG. 5 a plug 12 has moved into a position beneath the first sensor location 11/41. The pressure $P_1$ rises and the slider 22 moves without any pulse supply into the open position. As there is no spring for resetting, the slider 22 only has to overcome the friction relative to the housing block 18. The plug is loosened up:

$$P_1 > P_2.$$

While the plug 12 is moving in the conveyor direction x, a plurality of resetting pulses can be applied to the slider 22. It closes during the pulse duration and opens again immediately after the pulse dies away, and therefore allows air further to flow into the plug as long as $P_1$ is higher than $P_2$.

Figure 7:
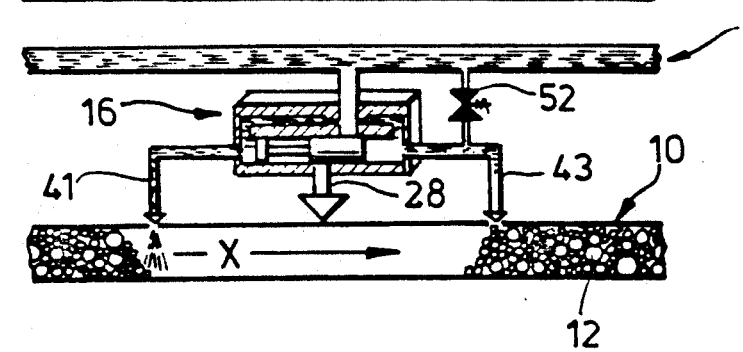

In FIG. 7 the plug 12 is past the sensor location 11/41:

$$P_1 \leq P_2.$$

The next air pulse arriving moves the slider 22 back into the closed position. The supply of air is interrupted until the next plug 12 arrives.

We claim:

1. In a method for transporting bulk material in a conveying direction in a conveying conduit wherein an auxiliary conduit providing a source of compressed air communicates with the conveying conduit at a first opening by means of a connecting conduit provided with a control member for selectively controlling the flow of compressed air into the conveying conduit from the auxiliary conduit wherein the control member opens the connecting conduit for passing air from the auxiliary conduit to the conveying conduit when the pressure upstream of the first opening is greater than the pressure downstream of the first opening and closes the connecting conduit interrupting the flow of air when the pressures are equalized, the improvement which comprises applying a closing force to said control member in a pulsewise manner.

2. A method according to claim 1 wherein the closing force is set at a lower value than a force in the same direction for moving the control member.

3. A method according to claim 1 wherein the applying of the closing force comprises applying a flow medium which is taken from an auxiliary source.

4. A method according to claim 1 wherein the applying of the closing force in a pulsewise manner comprises applying pulses of about 1 Hz with a pulse length of about 0.1 second.

5. A method according to claim 1 wherein the applying of the closing force comprises applying a constant pressure cushion of adjustable pressure.

6. A method according to claim 5 wherein the pressure cushion is set at a lower value than a force for a movement of the control valve in the same direction.

7. An apparatus for transporting bulk material in a conveying direction comprising: a conveyor conduit for transporting the bulk material; an auxiliary conduit for providing a source of compressed air; a connection conduit for feeding the compressed air from the auxiliary conduit to a first opening in the conveyor conduit; a control member positioned in the connection conduit and dividing the connection conduit into an upstream portion connected to the auxiliary conduit and a downstream portion connected to the conveyor conduit at the first opening for selectively controlling the flow of compressed air from the auxiliary conduit to the conveyor conduit; sensor means for sensing when the pressure upstream of the first opening is greater than the pressure downstream of the first opening for moving the control member in a first direction for passing air from the auxiliary conduit to the conveyor conduit; and pulse force generating means acting on the control member in opposition to the movement of the control member in the first direction.

8. An apparatus according to claim 7 wherein the control member comprises a magnet and magnetic coil.

9. An apparatus according to claim 7 wherein the pulse force generating means includes pneumatic valve means.

10. An apparatus according to claim 7 wherein the pulse force generating means includes electromagnetic valve means.

11. An apparatus according to claim 7 wherein the sensor means comprises a first sensor conduit connected to the conveyor conduit at a second opening upstream of the first opening.

12. An apparatus according to claim 11 wherein the first sensor conduit is connected to the upstream portion of the connection conduit.

13. An apparatus according to claim 12 wherein the control member has a first piston body and a second piston body at opposite ends of the control member.

14. An apparatus according to claim 13 wherein the pulse force generating means acts on the second piston body.

15. An apparatus according to claim 14 wherein the pulse force generating means comprises a separate pressure source.

16. An apparatus according to claim 14 wherein the first sensor conduit is connected to and acts on the first piston body for moving the control member in the first direction.

17. An apparatus according to claim 16 wherein the first sensor conduit is provided with a throttle section between the first piston body and the upstream portion of the connection conduit.

18. An apparatus according to claim 17 wherein the sensor means comprises a second sensor conduit connected to the conveyor conduit at a third opening downstream of the first opening, the second sensor conduit being connected to the upstream portion of the connection conduit and the second piston body, wherein the second sensor conduit acts on the second piston body and includes a throttle section between the second piston body and the upstream portion of the connection conduit.

19. An apparatus according to claim 18 wherein the pulse force generating means comprises a separate pressure source.

* * * * *